Figure 1:
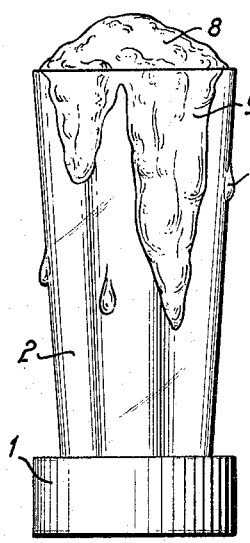

Nov. 22, 1966     W. FURCHTBAR     3,286,384

OPTICAL ADVERTISEMENT DEVICE SIMULATING A FILLED CONTAINER

Filed June 6, 1962

INVENTOR
WILLI FURCHTBAR

BY Dicke and Craig
ATTORNEYS

United States Patent Office 3,286,384
Patented Nov. 22, 1966

3,286,384
OPTICAL ADVERTISEMENT DEVICE SIMULATING A FILLED CONTAINER
Willi Furchtbar, Bopserwaldstrasse 45,
Stuttgart, Germany
Filed June 6, 1962, Ser. No. 200,513
Claims priority, application Germany, June 10, 1961,
F 34,134
12 Claims. (Cl. 40—106.52)

The present invention relates to an advertising device, and it is the object of the invention to provide an advertising device which creates the optical illusion of a filled container.

In order to create the optical effect of a container with a natural product therein the container is illuminated according to the invention at least from below and from the inside and provided with a double outer wall. Furthermore, it is made of a suitable plastic, for example, polymethacrylic ester, so as to produce the most suitable light-refractive conditions. The container is composed of a boxlike base of an opaque material, for example, metal, in which the illuminating means are installed and a glasslike outer container wall which is inserted or suspended in this base. Into this outer wall an inner container wall is inserted which is closed near its bottom by a bottom plate and at its upper end by a top plate. The inner wall is translucent and tinted in a color in accordance with the liquid which is to be simulated.

If the advertising device according to the invention should represent, for example, a glass filled with beer, the inventive features produce the impression that the container actually contains beer. In such a case, the top plate is designed to imitate the foam head on a fresh glass of beer. Since the bottom plate is colorless and the entire container is illuminated from below and from the inside, this bottom also appears exactly like that of a real beer glass.

Furthermore, by suspending at the inside of the container a number of thin strings on which transparent or tinted, ground, spherical or irregularly-shaped pearls of glass or plastic are threaded, the optical effect of rising carbon dioxide will be created. The natural impression of a full glass of beer or other carbonated beverage may be further improved by applying on the outer container wall streaks or runs of a foamy or frosted appearance and possibly also a few adhering drops. The entire device looks like a glass which is filled to the brim with fresh foamy beer and is placed on a table top.

The advertising device according to the invention may be further modified by separately illuminating the upper part of the container underneath the top plate. This considerably increases the luminous effect and the natural appearance. The impression of bubbly contents may be further considerably increased by rotating or moving the strings of pearls back and forth. If desired, it is also possible to produce shadow effects by means of a revolving sector-shaped blade or the like.

Of course, it is also possible to produce in the same manner and by similar means other optically effective advertising devices with any kind of simulated contents therein. Thus, for example, it is easily possible by suitable tinting and cooperation of the individual parts of the device and its illumination to attain the exact optical appearance of fruit juices, wines, liquors, milk, coffee, tea, cocoa, canned fruit and fruit preserves, tobacco products, cosmetic articles, or the like.

Figure 3:
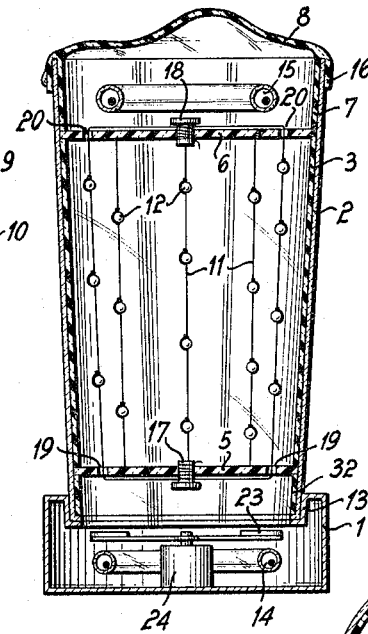
Figure 2:
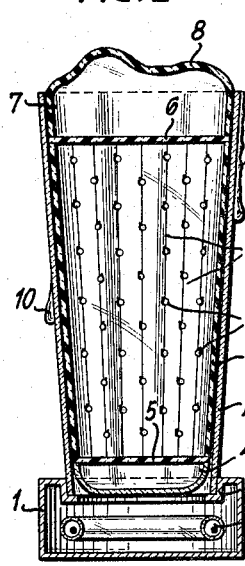
Figure 4:
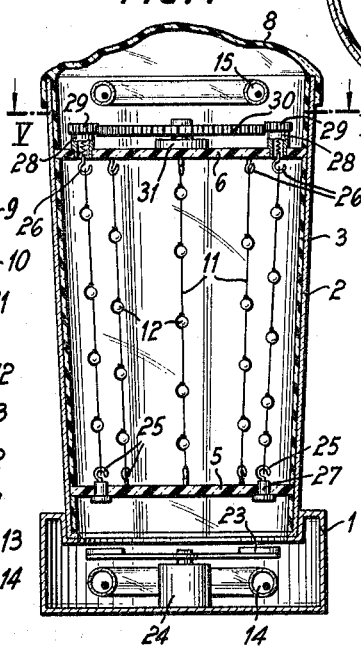
Figure 5:
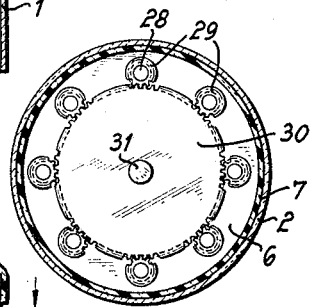
Figure 6:
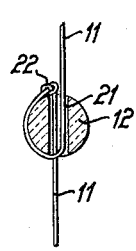

The features and advantages of the present invention will become more clearly apparent from the following detailed description of one preferred embodiment thereof which is illustrated in the accompanying drawings, in which:

FIGURE 1 shows a front view of a container representing a full glass of beer;
FIGURE 2 shows a central vertical section of the container according to FIGURE 1;
FIGURE 3 shows a central vertical section of a modification of the container according to FIGURE 1;
FIGURE 4 shows a central vertical section of a further modification of the container according to FIGURE 1;
FIGURE 5 shows a top plan view of the inside of the container according to FIGURE 4; while
FIGURE 6 shows an enlarged cross section of one of the pearls.

As illustrated in FIGURES 1 and 2 of the drawings, the advertising device according to the invention comprises a boxlike base 1, for example, of sheet metal in which an annular fluorescent tube 14 or any other suitable light source is mounted which may also be designed so as to produce a colored illumination. A glasslike outer wall 2 is inserted into this boxlike base 1, for example, by being fitted into or secured to brackets or a flange 13 or by being suspended in a suspension ring. Into this outer wall 2 a cup-shaped bottom 4 is inserted which is covered by a flat plate 5 which forms the inner bottom of the container and supports an inner wall 3 which is inserted from above into the outer container wall 2 and engages with the inner surface thereof. Near its upper end, the inner container wall 3 is covered by a flat cover plate 6 on which a spacing ring 7 rests which likewise engages with the outer wall 2. This ring 7 is closed toward the outside by a top plate 8 which may have any desired contour in accordance with the particular purpose of the container and which in the particular embodiment of the invention as illustrated in the drawings simulates the foam head on a full glass of beer or similar beverage. Ring 7 and plate 8 may, of course, also consist of one piece of material.

The different parts of the container consist of a suitable weather-resistant and transparent or translucent plastic, for example, polymethacrylic ester, and they are made of a color in accordance with the intended purpose so that, when the container is illuminated at least from below and from the inside, it will appear as being filled with a particular colored liquid. Thus, for example, the outer container wall 2 and the cup-shaped base 4 of the particular embodiment as illustrated are made of a clear glasslike plastic, while the inner container wall 3 is tinted. The spacing ring 7 and the top plate 8 are frosted like foam so that the entire container gives the appearance of a freshly filled glass of beer with a head of foam thereon.

The shape and clear color of the bottom 4 also create the impression from the outside as if this were really a filled beer glass with the usual solid glass bottom but of an unusually large size. This impression is further increased by the fact that individual pearls 12 appearing like bubbles are threaded on a number of thin transparent strings 11 within the container between the upper and lower plates 6 and 5. These strings are invisible from the outside through the double wall of the container, and the pearls 12 may consist, for example, of small ground pieces of glass in order to produce a diffused light refraction.

The similarity to a real glass of freshly poured beer becomes especially striking by simulating on the outer surface of the container wall 2 an overflow from the head of beer 8 by a few "runs" 9 and also a few condensation or beer drops 10 adhering to the surface. These runs 9 of an irregular contour extend downwardly from the upper edge of the outer wall 2 and may consist, for example, of a thin layer of plastic of a foamy appearance which is glued upon the wall 2. The individual drops 10 may likewise consist of plastic or of glass and be glued at different points upon the surface of wall 2.

The modification of the invention as illustrated in FIGURE 3 differs from the embodiment according to FIGURE 2 by the additional provision of an upper annular fluorescent tube or similar light source 15 which is mounted in the space between the cover plate 6 and the top plate 8 and additionally and very effectively illuminates the foam head from the inside which is simulated by the top plate 8 and the spacing ring 7. Furthermore, the top plate 8 is provided with a downwardly extending run 16 which overlaps the upper edge of the outer container wall 2 so that, when the advertising device is exhibited at the outside, for example, on top of a building, rain or snow cannot enter the container. The lower end of the outer wall 2 is fitted into the recessed flange 13 and since the cup-shaped bottom 4 according to FIGURE 2 is omitted, the bottom plate 5 is held in position by a lower inner spacing ring 32 forming the bottom member in this embodiment corresponding to the bottom 4 of FIGURE 2.

The opposite ends of the strings 11 for the pearls 12 pass through apertures 19 on the bottom plate 5 and apertures 20 in the cover plate 6 and are then tightened on and secured to pins 17 and 18 which are tightly fitted into central apertures in plates 5 and 6. As illustrated in FIGURE 6, each pearl 12 representing a bubble is provided with a bore 21 through which the string 11 is threaded which is then wound around one half of the periphery and again threaded through bore 21. At the point above its second entry through bore 21, a knot 22 is tied into the string 11. In this manner, each pearl 12 is firmly secured to the string 11 on which it is threaded. Pearls 12 do not have to be exactly spherical but they may just as well be polygonal or of an irregular shape. Instead of being made of glass, they may also consist of a transparent or colored plastic.

In order to produce particular light and shadow effects, a revolving or reciprocating sector-shaped blade 23 may be installed between the lower light 14 and the bottom plate 5 and be driven by a motor 24 which is mounted within the boxlike base 1. Of course, if desired, an additional device of the same kind may also be provided above the cover plate 6.

A further modification of the invention of FIGURE 3 is illustrated in FIGURES 4 and 5, in which the appearance of rising or moving bubbles is further improved and increased. For this purpose, the strings 11 on which the pearls 12 are threaded are tightened and arranged so as to rotate or move back and forth together with the pearls thereon. The lower end of each string 11 is secured to a hook 25. Hooks 25 and 26 are inserted into lower pins 27 and upper pins 28, respectively. If the pearls 12 are not intended to be rotated, all lower pins 27 are tightly inserted into the bottom plate 5 and all upper pins 28 into the cover plate 6. If the pearls should, however, be movable, pins 27 and 28 are rotatably mounted in plates 5 and 6. The bearing parts of pins 27 and 28 in plates 5 and 6 are of a reduced diameter. It is also advisable to make the upper pins 28 and possibly also the lower pins 27 of a tubular construction and to provide springs at the inside thereof for the hooks 26 so that the strings 11 will always be under a sufficient tension.

The upper pins 28 are further provided with small wheels 29 which are in engagement with a common driving wheel 30 which may be slowly driven by any suitable kind of driving means 31 so as either to revolve or to be reciprocated. The upper pins 28 are thereby rotated or turned back and forth and transmit this movement to the strings 11 with the pearls 12 and to the lower pins 27. Wheels 29 and driving wheel 30 may be of any desired type; they may, for example, be provided with gear teeth or a knurling or form a mere friction drive. Instead of being mounted above the cover plate 6, the driving means for the individual strings 11 may, of course, also be mounted underneath the bottom disk 5 within the boxlike base 1.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An advertising device simulating a filled container comprising a hollow base of an opaque material having an aperture in its top, a container comprising an outer container wall inserted with its lower end into said aperture and connected to said base, an inner substantially rigid and self-supporting container wall inserted into said outer wall, a bottom member disposed below the lower end of said inner wall, a bottom plate resting on said bottom member and supporting said inner wall, a cover plate closing the upper end of said inner wall, and an inverted cup-shaped member above said cover plate and inserted into the upper end of said outer wall and having an upper surface of a shape and color in accordance with the top of the simulated contents of said container, said inner container wall being of external shape substantially complementary to the internal shape of said outer container wall so that said inner container wall is in substantially flush abutting engagement with said outer container wall, all of said parts of said container consisting of a suitable light-permeable plastic, said outer wall consisting of a clear glasslike plastic, said inner wall being colored in accordance with said simulated contents, and said bottom and cover plates consisting of a translucent plastic, and an annular light source at least within said base for illuminating said container parts from the inside through said bottom member.

2. A device as defined in claim 1, further comprising an upper annular light source between said cover plate and said inverted cup-shaped member, said last member having a downwardly extending rim overlapping the upper edge of said outer container wall.

3. A device as defined in claim 1, further comprising a sector-shaped blade within said base intermediate said light source and said bottom plate, and means for rotating said blade.

4. A double-walled hollow advertising device optically effective to represent an internally illuminated filled container made of plastic material, comprising:
a box-like base,
an outer wall formed of glass-like transparent and clear material and inserted into said base,
a translucent member inserted into said outer wall,
an inner wall separate from and inserted into said outer wall and supported by said bottom member and closed-off at the top thereof by a top closure member,
a bottom closure plate between said bottom member and said inner wall and a top closure plate between said inner wall and said top closure member,
said inner wall being of a shape and color in accordance with the contents of the container to be simulated thereby,
a plurality of thin threads strung between said bottom and top closure plates, and pearl-shaped members simulating bubbles threaded on said strings in spaced relationship,
and illuminating means within said base for illuminating said container from within by way of said translucent bottom member, whereby the empty advertising device creates the optical illusion of a filled container.

5. A double-walled hollow advertising device optically effective to represent an internally illuminated filled container made of plastic material filled with beer, comprising:
- a box-like base,
- an outer wall formed of glass-like transparent and clear material and inserted into said base,
- a translucent bottom member inserted into said outer wall,
- an inner wall separate from and inserted into said outer wall and supported by said bottom member and closed-off at the top thereof by a top closure member and a spacer ring between said inner wall and said top closure member,
- a bottom closure plate between said bottom member and said inner wall and a top closure plate between said inner wall and said top closure member,
- said inner wall being of a shape and color in accordance with the beer contents of the container to be simulated thereby,
- and illuminating means within said base for illuminating said container from within by way of said translucent bottom member, whereby the empty advertising device creates the optical illusion of a filled container,
- said top closure member and said spacer ring being of a shape and frosty color simulating the foamy head,
- and said clear outer wall being provided with corresponding irregular frosty streaks and individual drops simulating foam-like streaks and drops, respectively.

6. A double-walled hollow advertising device optically effective to represent an internally illuminated filled container made of plastic material filled with beer, comprising:
- a box-like base,
- an outer wall formed of glass-like transparent and clear material and inserted into said base,
- a translucent bottom member inserted into said outer wall,
- an inner wall separate from and inserted into said outer wall and supported by said bottom member and closed-off at the top thereof by a top closure member and a spacer ring between said inner wall and said top closure member,
- a bottom closure plate between said bottom member and said inner wall and a top closure plate between said inner wall and said top closure member,
- said inner wall being of a shape and color in accordance with the beer contents of the container to be simulated thereby,
- a plurality of thin threads strung between said bottom and top closure plates, and pearl-shaped members simulating bubbles threaded on said strings in spaced relationship,
- and illuminating means within said base for illuminating said container from within by way of said translucent bottom member, whereby the empty advertising device creates the optical illusion of a filled container,
- said top closure member and said spacer ring being of a shape and frosty color simulating the foamy head,
- and said clear outer wall being provided with correponding irregular frosty streaks and individual drops simulating foam-like streaks and drops, respectively.

7. An advertising device simulating a filled container comprising a hollow base of an opaque material having an aperture in its top, a container comprising an outer container wall inserted with its lower end into said aperture and connected to said base, an inner container wall inserted into said outer wall, a cup-shaped bottom member closing the lower end of said inner wall, a bottom plate interposed between said cup-shaped member and said inner wall, a cover plate closing the upper end of said inner wall, and an inverted cup-shaped member above said cover plate and inserted into the upper end of said outer wall and having an upper surface of a shape and color in accordance with the top of the simulated contents of said container, all of said parts of said container consisting of a suitable light-permeable plastic, said outer wall and said cup-shaped member consisting of a clear, glass-like plastic, said inner wall being colored in accordance with said simulated contents, and said bottom and cover plates consisting of a translucent plastic, and an annular light source at least within said base for illuminating said container parts from the inside through said cup-shaped member, a plurality of thin strings connected at their opposite ends to said cover and bottom plates, and pearl-shaped members simulating bubbles threaded on and spaced from each other on said strings.

8. An advertising device simulating a filled container comprising a hollow base of an opaque material having an aperture in its top, a container comprising an outer container wall inserted with its lower end into said aperture and connected to said base, an inner container wall inserted into said outer wall, a cup-shaped bottom member closing the lower end of said inner wall, a bottom plate interposed between said cup-shaped member and said inner wall, a cover plate closing the upper end of said inner wall, and an inverted cup-shaped member above said cover plate and inserted into the upper end of said outer wall and having an upper surface of a shape and color in accordance with the top of the simulated contents of said container, all of said parts of said container consisting of a suitable light-permeable plastic, said outer wall and said cup-shaped member consisting of a clear glass-like plastic, said inner wall being colored in accordance with said simulated contents, and said bottom and cover plates consisting of a translucent plastic, and an annular light source at least within said base for illuminating said container parts from the inside through said cup-shaped member, and a plurality of thin strings connected at their opposite ends to said cover and bottom plates, and pearl-shaped members simulating bubbles, each having a bore threaded on and spaced from each other on said strings, said threads passing through said bores, then extending around one-half of the periphery of each of said pearls, then being knotted and again threaded through said bores.

9. A double-walled hollow advertising device optically effective to represent an internally illuminated filled container made of plastic material, comprising:
- a box-like base,
- an outer wall formed of glass-like transparent and clear material and inserted into said base,
- a translucent bottom member inserted into said outer wall,
- an inner substantially rigid and self-supporting wall separate from and inserted into said outer wall and supported by said bottom member and closed-off at the top thereof by a top closure member,
- a bottom closure plate between said bottom member and said inner wall and a top closure plate between said inner wall and said top closure member,
- said inner wall being of a shape and color in accordance with the contents of the container to be simulated thereby,
- illuminating means within said base for illuminating said container from within by way of said translucent bottom member, whereby the empty advertising device creates the optical illusion of a filled container,
- and a plurality of thin strings, and pearl-shaped members simulating bubbles threaded on and spaced from each other and knotted on said strings, said cover and bottom plates having bores, a pin connected centrally to each of said cover and bottom plates, the opposite ends of said strings passing through said bores and being connected to and tightened on said pins.

10. A double-walled hollow advertising device optically effective to represent an internally illuminated filled container made of plastic material, comprising:
- a box-like base,
- an outer wall formed of glass-like transparent and clear material and inserted into said base,
- a translucent bottom member inserted into said outer wall,
- an inner substantially rigid and self-supporting wall separate from and inserted into said outer wall and supported by said bottom member and closed-off at the top thereof by a top closure member,
- a bottom closure plate between said bottom member and said inner wall and a top closure plate between said inner wall and said top closure member,
- said inner wall being of a shape and color in accordance with the contents of the container to be simulated thereby,
- illuminating means within said base for illuminating said container from within by way of said translucent bottom member, whereby the empty advertising device creates the optical illusion of a filled container,
- and a plurality of strings, and pearl-shaped members simulating bubbles threaded on and spaced from each other an knotted on said strings intermediate said cover and bottom plates, and means for moving said strings with said pearls thereon.

11. A double-walled hollow advertising device optically effective to represent an internally illuminated filled container made of plastic material, comprising:
- a box-like base,
- an outer wall formed of glass-like transparent and clear material and inserted into said base,
- a translucent bottom member inserted into said outer wall,
- an inner substantially rigid and self-supporting wall separate from and inserted into said outer wall and supported by said bottom member and closed-off at the top thereof by a top closure member,
- a bottom closure plate between said bottom member and said inner wall and a top closure plate between said inner wall and said top closure member,
- said inner wall being of a shape and color in accordance with the contents of the container to be simulated thereby,
- illuminating means within said base for illuminating said container from within by way of said translucent bottom member, whereby the empty advertising device creates the optical illusion of a filled container,
- and a plurality of strings, and pearl-shaped members simulating bubbles threaded on and spaced from each other and knotted on said strings, said cover and bottom plates having bores, connecting means rotatably mounted in said bores, the opposite ends of said strings being connected to said connecting means, resilient means for tightening said strings, and means for rotating said connecting means and said strings and said pearls thereon.

12. A double-walled hollow advertising device optically effective to represent an internally illuminated filled container made of plastic material, comprising:
- a box-like base,
- an outer wall formed of glass-like transparent and clear material and inserted into said base,
- a translucent bottom member inserted into said outer wall,
- an inner substantially rigid and self-supporting wall separate from and inserted into said outer wall and supported by said bottom member and closed-off at the top thereof by a top closure member,
- a bottom closure plate between said bottom member and said inner wall and a top closure plate between said inner wall and said top closure member,
- said inner wall being of a shape and color in accordance with the contents of the container to be simulated thereby,
- illuminating means within said base for illuminating said container from within by way of said translucent bottom member, whereby the empty advertising device creates the optical illusion of a filled container,
- said bottom and top plates being provided with bores, a plurality of strings, and pearl-shaped members simulating bubbles threaded on and spaced from each other and knotted on said strings, connecting means rotatably mounted in said bores, the opposite ends of said strings being connected to said connecting means, resilient means for tightening said strings, a small wheel on each of said connecting means, a large wheel engaging with all of said small wheels for rotating the same and said connecting means, said strings and said pearls thereon, and means for slowly rotating said large wheel.

References Cited by the Examiner

UNITED STATES PATENTS

| | | | |
|---|---|---|---|
| 1,068,875 | 7/1913 | Fielding | 40—126 X |
| 1,080,340 | 12/1913 | Heissenbuttel | 40—126 X |
| 1,466,422 | 8/1923 | Clark | 40—126 |
| 1,612,362 | 12/1926 | Decker | 40—126 X |
| 1,804,595 | 5/1931 | Curtiss | 40—106.53 |
| 1,971,144 | 8/1934 | Lawrence | 40—106.53 |
| 2,731,747 | 1/1956 | Hazelroth | 40—132 X |
| 2,906,169 | 9/1959 | Saffir | 40—135 X |

FOREIGN PATENTS

| | | |
|---|---|---|
| 511,241 | 5/1952 | Belgium. |
| 310,028 | 7/1933 | Italy. |
| 461,848 | 2/1951 | Italy. |

EUGENE R. CAPOZIO, *Primary Examiner.*

JEROME SCHNALL, *Examiner.*

H. F. ROSS, *Assistant Examiner.*